(12) United States Patent
Yamasaki

(10) Patent No.: US 8,374,255 B2
(45) Date of Patent: Feb. 12, 2013

(54) MOVING PICTURE ENCODER, DECODER, AND CODING SYSTEM

(75) Inventor: Takahiro Yamasaki, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 315 days.

(21) Appl. No.: 12/654,335

(22) Filed: Dec. 17, 2009

(65) Prior Publication Data

US 2010/0208801 A1 Aug. 19, 2010

(30) Foreign Application Priority Data

Feb. 19, 2009 (JP) .................................. 2009-036928

(51) Int. Cl.
H04N 7/18 (2006.01)
(52) U.S. Cl. .............................. 375/240.27; 375/240.25
(58) Field of Classification Search . 375/240.01–240.29
See application file for complete search history.

(56) References Cited

U.S. PATENT DOCUMENTS

| | | | |
|---|---|---|---|
| 7,233,269 B1 * | 6/2007 | Chen et al. ..................... | 341/107 |
| 2008/0291065 A1 * | 11/2008 | Lu et al. ......................... | 341/107 |
| 2009/0323798 A1 * | 12/2009 | He et al. ..................... | 375/240.01 |
| 2010/0111198 A1 * | 5/2010 | Lakus-Becker et al. . | 375/240.27 |

OTHER PUBLICATIONS

Anne Aaron, Shantanu Rane, Eric Setton, and Bernd Girod, "Transform-domain Wyner-Ziv Codec for Video" In Proc, SPIE Visual Communications and Image Processing, San Jose, CA (2004).
Marleen Morbee, Josep Prades-Nebot, Antoni Roca, Aleksandra Pižurica, and Wilfried Philips "Improved Pixel-Based Rate Allocation for Pixel-Domain Distributed Video Coders Without Feedback Channel," ICIVS 2007.
João Ascenso, Catarina Brites, and Fernando Pereira, "Improving Frame Interpolation With Spatial Motion Smoothing for Pixel Domain Distributed Video Coding," 5th EURASIP Conference on Speech and Image Processing, Multimedia Communications and Services, Jul. 2005.

* cited by examiner

*Primary Examiner* — Andy Rao
(74) *Attorney, Agent, or Firm* — Rabin & Berdo, P.C.

(57) ABSTRACT

A moving picture sequence is divided into key frames, which are coded by a conventional method, and non-key frames, which are coded to obtain error-correcting information. The encoder and decoder independently generate predicted images for each non-key frame. The encoder compares its predicted image with the original non-key frame to estimate how much error-correcting information the decoder will need to decode the non-key frame by correcting prediction errors in the decoder's predicted image, and sends the decoder that amount of error-correcting information together with correlation information indicating how closely the predicted image and the original non-key frame are correlated. Before decoding the non-key frame, the decoder modifies the correlation information to compensate for differences in the prediction methods employed by the encoder and decoder. The modification enables the decoding process to converge faster.

8 Claims, 6 Drawing Sheets

MOVING PICTURE ENCODER, DECODER, AND CODING SYSTEM

BACKGROUND OF THE INVENTION

1. Field of the Invention

The present invention relates to the encoding and decoding of moving picture sequences and is applicable in, for example, distributed video coding.

2. Description of the Related Art

Distributed video coding (DVC) is a new coding method that has attracted much recent attention. It is based on two key results in information theory, the Slepian-Wolf theorem and the Wyner-Ziv theorem, which showed that data could be compressed as efficiently by two independent encoders as by one encoder.

In DVC coding, a sequence of video frames is divided into key frames and non-key frames, the latter often referred to as Wyner-Ziv frames or WZ frames. The sequence of key frames is coded by a conventional intraframe or interframe coding method, and the coded data are sent to the decoder. The sequence of WZ frames is coded independently by a method that generates error-correcting information, generally referred to as parity bits, and only the parity bits, or only some of them, are sent to the decoder.

A basic DVC coding method is described by Aaron et al. in 'Transform-Domain Wyner-Ziv Codec for Video', *Proc. SPIE Visual Communications and Image Processing*, 2004. In the encoder, a discrete cosine transform (DCT) is used to transform each Wyner-Ziv frame to the coefficient domain, the coefficients are grouped into bands, the coefficients in the k-th band are quantized by a $2^{Mk}$-level quantizer, the quantized coefficients ($q_k$) are expressed in fixed numbers of bits, and the bit planes are extracted and supplied to a Slepian-Wolf encoder, which is a type of encoder that produces data bits and parity bits. The parity bits are stored in a buffer for transmission to the decoder. The data bits are discarded (as implied but not explicitly shown by Aaron, et al. in FIG. 1 of the above reference).

The decoder decodes the key frames by conventional methods, uses the decoded key frames to generate a predicted image for each Wyner-Ziv frame, applies a DCT to convert the predicted image to the coefficient domain, groups the coefficients into bands, and inputs the coefficients in each band as side information to a Slepian-Wolf decoder. The Slepian-Wolf decoder uses the parity bits received from the encoder to correct prediction errors in the side information by an iterative process. When a satisfactory decoded result is obtained, an inverse discrete cosine transform (IDCT) is applied to reconstruct the image of the Wyner-Ziv frame.

In the encoder described by Aaron et al., the Slepian-Wolf encoder uses a punctured turbo code to produce the parity bits, originally sends the decoder a subset of the parity bits, and sends further subsets, if necessary, on request from the decoder. A problem with this scheme is that it requires a feedback channel from the decoder to the encoder, so it is inapplicable when no feedback channel is available. Another problem is that generating and sending the successive requests for more parity bits takes extra time and delays the decoding process.

In an alternative scheme, described by Morbee et al. in 'Improved Pixel-Based Rate Allocation For Pixel-Domain Distributed Video Coders Without Feedback Channel', *ICIVS* 2007, the encoder generates a predicted image of its own for each Wyner-Ziv frame, compares this predicted image with the original image in the Wyner-Ziv frame, thereby estimates the number of parity bits that will be required for accurate decoding of the Wyner-Ziv frame, and sends this number of parity bits without having to be asked for them by the decoder. This eliminates the need for a feedback channel and avoids the delays associated with repeated requests.

DVC systems can also be improved by having the encoder supply the decoder with extra information to expedite the Slepian-Wolf decoding process. If the encoder generates a predicted image, for example, then it can the supply the decoder with correlation information indicating how closely the predicted image is correlated with the original image.

A problem with this scheme is that DVC coding and decoding will be incorporated into many types of devices produced by many different manufacturers. The methods of generating predicted images are likely to differ considerably, depending on the manufacturer and the cost of the device. Since a principal reason for using DVC is to reduce the processing load on the encoder, it is also likely that the encoder will use a simple prediction method that requires comparatively little processing, while the decoder uses a more elaborate prediction method to obtain a better predicted image, in order to minimize the number of parity bits required in the decoding process.

As a result, the encoder will tend to generate a predicted image that differs more from the original image than does the predicted image generated by the decoder. As a result, the encoder may underestimate the correlation between the original image and the decoder's predicted image. If the decoder operates according to the underestimated correlation information supplied by the encoder, it will have a tendency to assume that predicted values that are actually correct are incorrect. This mistaken assumption will take additional decoding iterations to correct, delaying the convergence of the decoding process.

SUMMARY OF THE INVENTION

An object of the present invention is to enable rapid decoding in a DVC system in which the encoder supplies the decoder with correlation information, even if the correlation information is inaccurately estimated.

The invention provides a method of decoding a sequence of moving picture frames that has been divided into a sequence of key frames and a sequence of non-key frames. The method includes receiving coded data, error-correcting information, and correlation information from an encoder. The coded data represent the key frames. The error-correcting information represents the non-key frames. The correlation information indicates expected correlations between predicted and original forms of the non-key frames. The method also includes:

decoding the coded data to obtain decoded key frames;

generating a predicted image for each non-key frame from the decoded key frames;

modifying the correlation information received from the encoder to obtain modified correlation information;

correcting the predicted image according to the error-correcting information and the modified correlation information to obtain a decoded non-key frame; and generating a reconstructed non-key frame from the predicted image and the decoded non-key frame.

The correlation information may be modified by multiplication by a weighting coefficient. The weighting coefficient may be predetermined, derived from motion information used in generating the predicted image, or derived from information received from the encoder.

The invention also provides a method of encoding a sequence of moving picture frames that has been divided into a sequence of key frames and a sequence of non-key frames, for use with the above method of decoding the sequence. The method of encoding includes:

encoding the key frames to generate the coded data;

encoding the non-key frames to generate the error-correcting information;

generating a predicted image for each non-key frame from the key frames;

sending the decoder information describing a characteristic of the non-key frame or the method by which the predicted image was generated;

comparing each non-key frame with the predicted image, thereby determining a correlation between the predicted image and the non-key frame and deciding how much error correcting information to send to the decoder;

generating correlation information indicating the correlation; and sending the correlation information to the decoder.

The invention also provides a decoder, an encoder, and a moving picture coding system employing the above methods.

Appropriate modification of the correlation information received from the encoder improves the accuracy of the correlation information, and enables more rapid decoding by reducing the necessary number of decoding iterations.

DETAILED DESCRIPTION OF THE INVENTION

Figure 1:
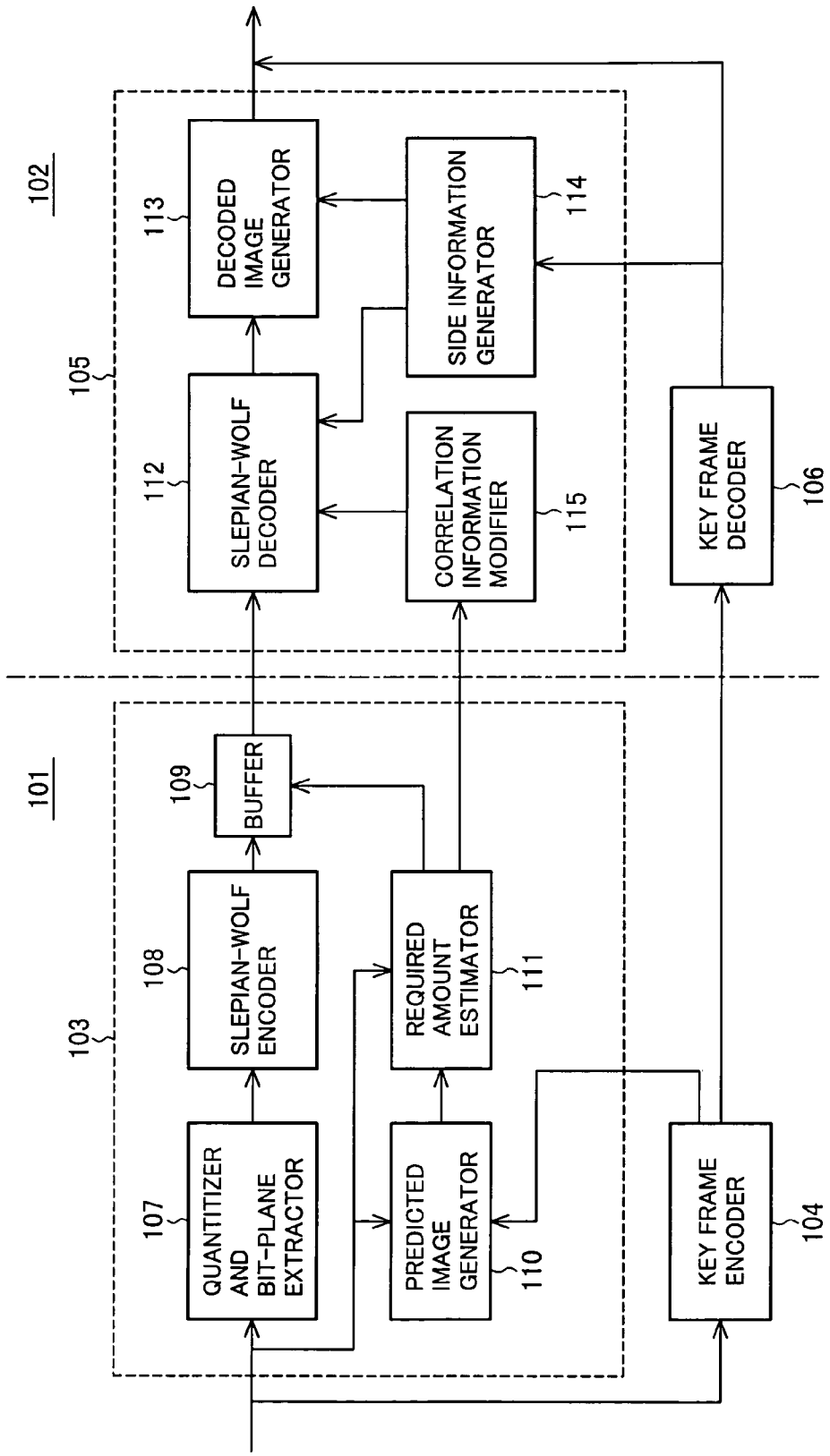
FIG. 1 is a block diagram of a moving picture coding system illustrating a first embodiment of the invention.

Embodiments of the invention will now be described with reference to the attached drawings, in which like elements are indicated by like reference characters.

First Embodiment

Referring to FIG. 1, the first embodiment is a distributed video coding system including a moving picture encoder 101 and a moving picture decoder 102. Either or both of the moving picture encoder 101 and moving picture decoder 102 may be implemented with specialized hardware, or by using a general purpose computing device having a central processing unit (CPU), read-only memory (ROM), random-access memory (RAM), and other well-known facilities to execute an encoding or a decoding program. In the latter case, the blocks in FIG. 1 are functional blocks of the program.

The moving picture encoder 101 includes a Wyner-Ziv frame encoder 103 and a key frame encoder 104. The moving picture decoder 102 includes a Wyner-Ziv frame decoder 105 and a key frame decoder 106. The moving picture encoder 101 receives an input sequence of frames of a moving picture, which is separated into a key frame sequence and a Wyner-Ziv frame sequence.

The key frame encoder 104 takes the key frames from the input sequence, encodes them by a conventional coding method such as one of the methods developed by the Joint Photographic Experts Group (JPEG) or the Moving Picture Experts Group (MPEG), and sends the resulting coded key frame data to the key frame decoder 106 in the moving picture decoder 102. The key frame encoder 104 also includes a local decoder (not shown) that decodes the coded key frame data and a frame memory (not shown) for internal storage of key frame data and the locally decoded key frame data.

The Wyner-Ziv frame encoder 103 takes the Wyner-Ziv frames from the input sequence, encodes them as described below, and outputs error-correcting information and correlation information to the Wyner-Ziv frame decoder 105 in the moving picture decoder 102.

The Wyner-Ziv frame encoder 103 comprises a quantizer and bit-plane extractor 107, a Slepian-Wolf encoder 108, a buffer 109, a predicted image generator 110, and a required amount estimator 111.

The quantizer and bit-plane extractor 107 quantizes the data in each Wyner-Ziv frame and decomposes the quantized values into bit planes.

The Slepian-Wolf encoder 108 encodes each bit plane by using a turbo code or a low-density parity-check (LDPC) code. These codes generate error-correcting information that could be used to correct errors in the bit plane data if the bit plane data were to be transmitted over a noisy channel. The Slepian-Wolf encoder 108 stores the error-correcting information in the buffer 109 and discards the bit plane data. The error-correcting information may comprise the parity bits referred to in the background description above.

The predicted image generator 110 receives the locally decoded key frame data from the key frame encoder 104 and generates a predicted image for each Wyner-Ziv frame on the basis of one or more preceding and/or following locally decoded key frames, using a well-known prediction method such as averaging of the data values in the preceding and following key frames. The original key frame data and information from the Wyner-Ziv frames themselves may also be used, although this is not necessary. The invention is not restricted to any particular prediction method.

The required amount estimator 111 compares each Wyner-Ziv frame with the corresponding predicted image generated by the predicted image generator 110 to determine how well the predicted image generator 110 was able to predict the image, that is, to determine how closely correlated the predicted image is with the original image. On the basis of this correlation information, the predicted image generator 110 estimates how much error-correcting information the Wyner-Ziv frame decoder 105 will need for successful decoding, and directs the buffer 109 to transmit that amount of error-correcting information to the Wyner-Ziv frame decoder 105. The predicted image generator 110 also transmits the correlation information directly to the Wyner-Ziv frame decoder 105.

The buffer 109 stores the error-correcting information received from the Slepian-Wolf encoder 108 and sends the amount of error-correcting information estimated by the required amount estimator 111 to the Wyner-Ziv frame decoder 105.

In the moving picture decoder 102, the key frame decoder 106 decodes the coded key frame data received from the key frame encoder 104 to obtain decoded key frames.

The Wyner-Ziv frame decoder 105 includes a Slepian-Wolf decoder 112, a decoded image generator 113, a side information generator 114, and a correlation information modifier 115.

The side information generator 114 receives the decoded key frames from the key frame decoder 106 and generates a predicted image for each Wyner-Ziv frame. The predicted image is generated from one or more key frames preceding and/or following the Wyner-Ziv frame. The side information generator 114 then divides the predicted image into bit planes and sends the bit planes to the Slepian-Wolf decoder 112 and the decoded image generator 113.

The correlation information modifier 115 modifies the correlation information received from the required amount estimator 111 in the Wyner-Ziv frame encoder 103 and provides the modified correlation information to the Slepian-Wolf decoder 112. The modification process will be described in more detail below.

The Slepian-Wolf decoder 112 uses the modified correlation information to estimate the number of prediction errors in the bit plane data received from the side information generator 114, and uses the error-correcting information received from the Wyner-Ziv frame encoder 103 to correct the errors, thereby producing decoded bit plane data.

The decoded image generator 113 assembles the bit planes received from the Slepian-Wolf decoder 112 to reconstruct each Wyner-Ziv frame. Where appropriate, the decoded image generator 113 may also used the bit plane data received from the side information generator 114. The decoded image generator 113 outputs each reconstructed Wyner-Ziv frame in sequence with the decoded key frames output from the key frame decoder 106.

The encoding and decoding of Wyner-Ziv frames will now be described with reference to the flowcharts in FIGS. 2 and 3. A description of the encoding and decoding of key frames will be omitted, as conventional methods may be employed. It will be assumed that the key frame sequence consists of the odd-numbered frames and the Wyner-Ziv frame sequence consists of the even-numbered frames, and that each Wyner-Ziv frame is predicted from the immediately preceding and following key frames.

Figure 2:
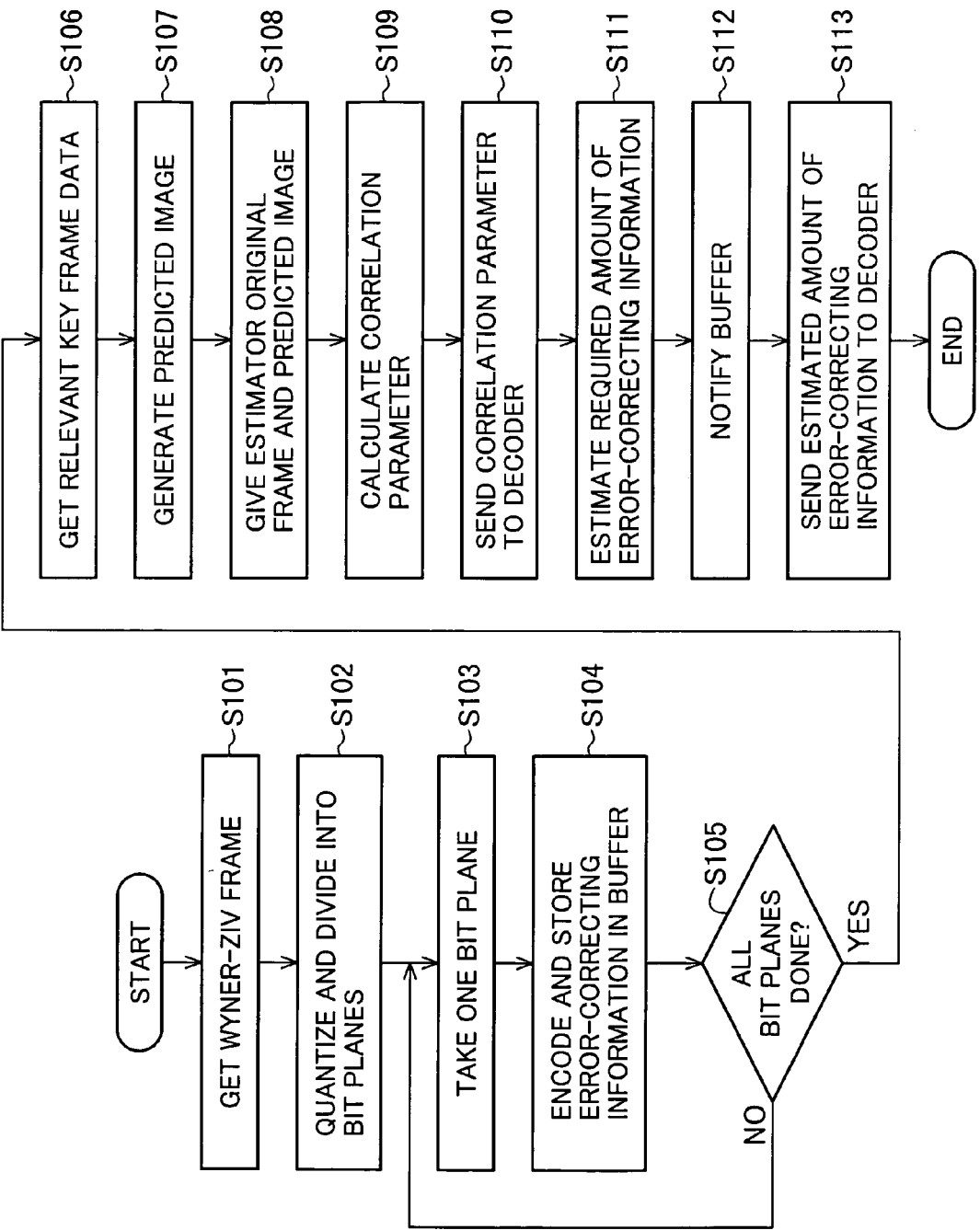
FIG. 2 is a flowchart illustrating the encoding process in the first embodiment.
Figure 3:
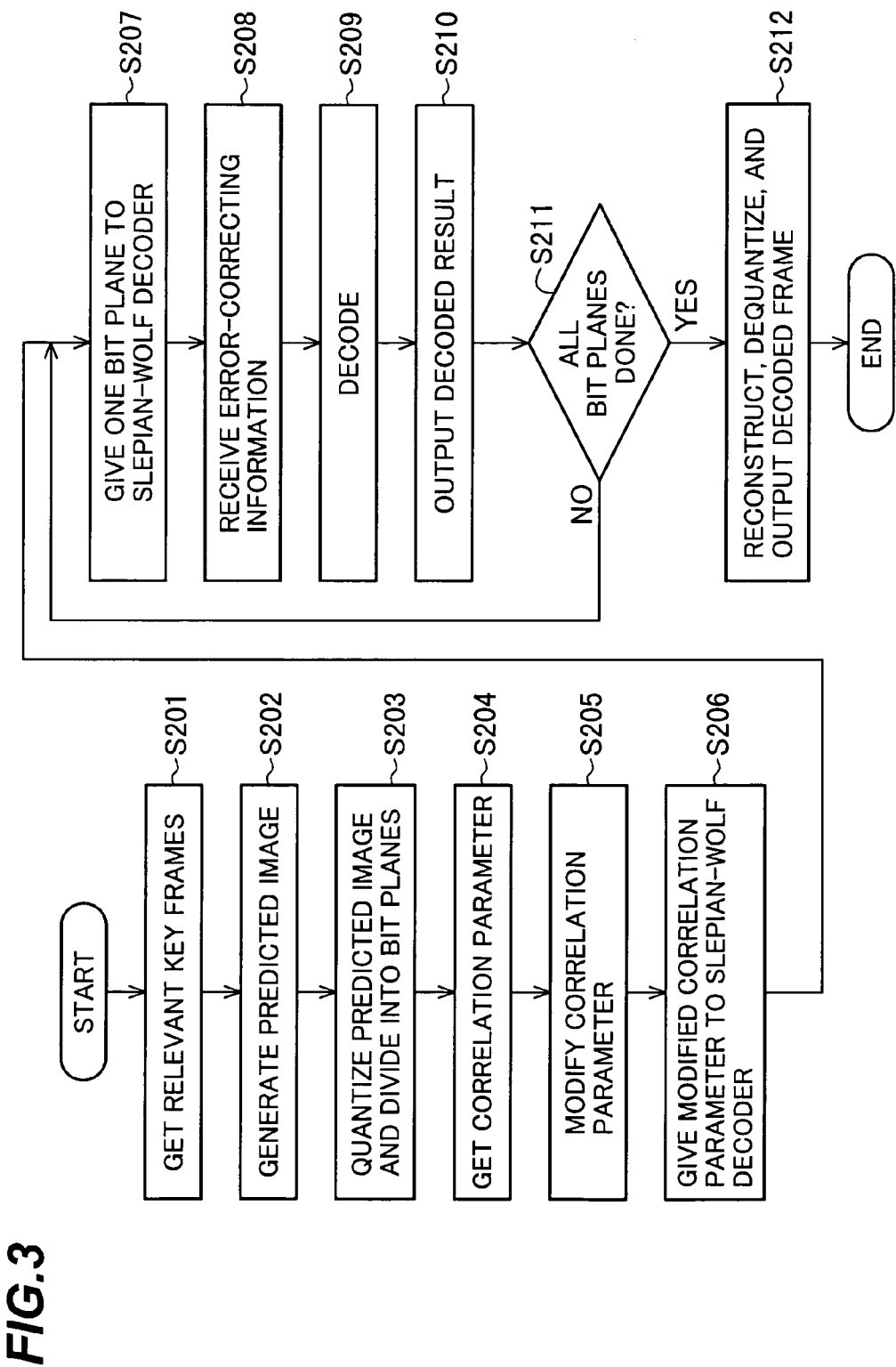
FIG. 3 is a flowchart illustrating the decoding process in the first embodiment.

Referring to FIG. 2, when the encoding of a Wyner-Ziv frame such as the second frame begins, the frame is input to the quantizer and bit-plane extractor 107 (step S101), quantized, and divided into bit planes (step S102). A bit plane includes corresponding bits of the quantized frame data: for example, the most significant bits of the quantized data for each picture element (pixel).

Next, one bit plane is selected and input to the Slepian-Wolf encoder 108 (step S103), typically starting with the most significant bit plane. The Slepian-Wolf encoder 108 encodes the bit plane and stores the resulting error-correcting information in the buffer 109 (step S104).

The next step (S105) is a decision step that decides whether all the bit planes of the current Wyner-Ziv frame have been encoded. If this is not the case, the process returns to step S103 to select and encode the next bit plane. When all bit planes have been encoded, the process proceeds to step S106.

In step S106 the predicted image generator 110 receives the locally decoded data for the preceding and following key frames from the key frame encoder 104. When the second frame is encoded, for example, the predicted image generator 110 receives the locally decoded first and third frames. The predicted image generator 110 may also receive the original key frame data from the key frame encoder 104. From the data it receives, the predicted image generator 110 generates a predicted image for the Wyner-Ziv frame (step S107).

The predicted image generated by the predicted image generator 110 and the original Wyner-Ziv frame are supplied to the required amount estimator 111 (step S108). As correlation information, the required amount estimator 111 derives a parameter of the statistical distribution of prediction errors made by the predicted image generator 110 (step S109), and sends this correlation parameter to the correlation information modifier 115 in the moving picture decoder 102 (step S110).

The correlation parameter also provides an estimate of how well the moving picture decoder 102 will be able to predict the Wyner-Ziv frame, enabling the required amount estimator 111 to estimate how much error-correcting information the moving picture decoder 102 will need. More specifically, treating the predicted image generated by the predicted image generator 110 as an approximation to the predicted image that will be generated by the side information generator 114 in the Wyner-Ziv frame decoder 105, the required amount estimator 111 estimates the number of prediction errors that will be made by the side information generator 114 and estimates the amount of error-correcting information that the Slepian-Wolf decoder 112 will need to correct the estimated number of prediction errors (step S111).

Known methods, described by Morbee et al. in the reference cited above, may be used to estimate the correlation parameter and the required amount of error-correcting information. Specifically, the correlation parameter can be derived from the differences between the original Wyner-Ziv frame and the predicted image received from the predicted image generator 110, on the assumption that the prediction errors have a Laplacian distribution with a zero mean value. The expected bit error rate of the decoder's predicted image can then be estimated from the estimated Laplacian distribution parameter, and the necessary amount of error-correcting information can be estimated from the bit error rate.

The required amount estimator 111 notifies the buffer 109 of its estimate of the required amount of error-correcting information (step S112), and the buffer 109 sends the estimated amount of error-correcting information to the Wyner-Ziv frame decoder 105 in the moving picture decoder 102 (step S113).

The decoding of a Wyner-Ziv frame (e.g., the second frame) takes place after the key frame decoder 106 in the moving picture decoder 102 has already decoded the preceding and following key frames (e.g., the first and third frames). Referring to FIG. 3, the side information generator 114 receives the preceding and following decoded key frames from the key frame decoder 106 (step S201), generates a predicted image for the Wyner-Ziv frame from the preceding and following decoded key frames (step S202), and then quantizes the predicted image and divides it into bit planes (step S203). The predicted image may be generated by taking average values of the preceding and following decoded key frames, or by more advanced methods using motion estimation and compensation, as described by Ascenso et al. in 'Improving frame interpolation with spatial motion smoothing for pixel domain distributed video coding', 5th EURASIP Conference on Speech and Image Processing, Multimedia Communications and Services, July 2005. The prediction method used by the side information generator 114 is not necessarily the same as the prediction method used by the predicted image generator 110 in the moving picture encoder 101.

In addition, the correlation information modifier 115 receives (step S204) and modifies (step S205) the correlation information (parameter) sent from the required amount estimator 111 in the moving picture encoder 101, and supplies the modified parameter value to the Slepian-Wolf decoder 112 (step S206).

If the prediction errors are assumed to have a Laplacian distribution with a zero mean value, the correlation information received from the correlation information modifier 115 is the scale parameter α given by the following formula, where σ is the standard deviation of the distribution. Further details can be found in Morbee et al.

$$\alpha^2=2/\sigma^2$$

Since distributed video coding is generally used to reduce the processing load on the moving picture encoder 101, the predicted image generated by the predicted image generator 110 in the Wyner-Ziv frame encoder 103 will usually be less accurate than the predicted image generated by the side information generator 114 in the Wyner-Ziv frame decoder 105, and its error distribution will have a larger standard deviation and a smaller value of the parameter α. The correlation information modifier 115 compensates by increasing the value of the parameter α received from the Wyner-Ziv frame encoder 103, to bring the value of α closer to the scale of the prediction error distribution of the side information generator 114. For example, the correlation information modifier 115 may multiply the received value of α by a weighting coefficient W to obtain a modified correlation parameter W·α. The weighting coefficient W may be fixed, or it may be adjusted according to conditions. If the side information generator 114 employs motion compensation, for example, the weighting coefficient W may be obtained from the motion information generated by the side information generator 114 by use of a suitable mathematical function or a lookup table.

The Slepian-Wolf decoder 112 receives a predicted bit plane from the side information generator 114 (step S207), receives the corresponding error-correcting information from the Wyner-Ziv frame encoder 103 (step S208), and applies the error-correcting information to the bit plane with reference to the modified correlation parameter to perform a Slepian-Wolf decoding process that corrects errors in the predicted bits (step S209). The decoding process is an iterative process that converges toward the true values of the original Wyner-Ziv frame. When the process has converged far enough to produce satisfactory agreement between the bit plane data and the error-correcting information, the decoded bit plane is output to the decoded image generator 113 (step S210).

The next step (S211) is a decision step to decide whether all the bit planes of the current Wyner-Ziv frame have been decoded. If this is not the case, the process returns to step S207 to decode the next bit plane.

When all bit planes have been decoded, the decoded image generator 113 reconstructs the Wyner-Ziv frame, also referring, if necessary, to the predicted image generated by the side information generator 114, then dequantizes and outputs the reconstructed frame (step S212).

The key frame decoder 106 and decoded image generator 113 alternately output decoded odd-numbered and even-numbered frames to produce a decoded video sequence.

By modifying the correlation information supplied by the Wyner-Ziv frame encoder 103, the correlation information modifier 115 brings the correlation parameter value closer to the true value of the error distribution of the predicted image generated by the side information generator 114. This enables the Slepian-Wolf decoding process to converge more quickly, so that a decoded image is obtained with fewer decoding iterations.

Second Embodiment

Figure 4:
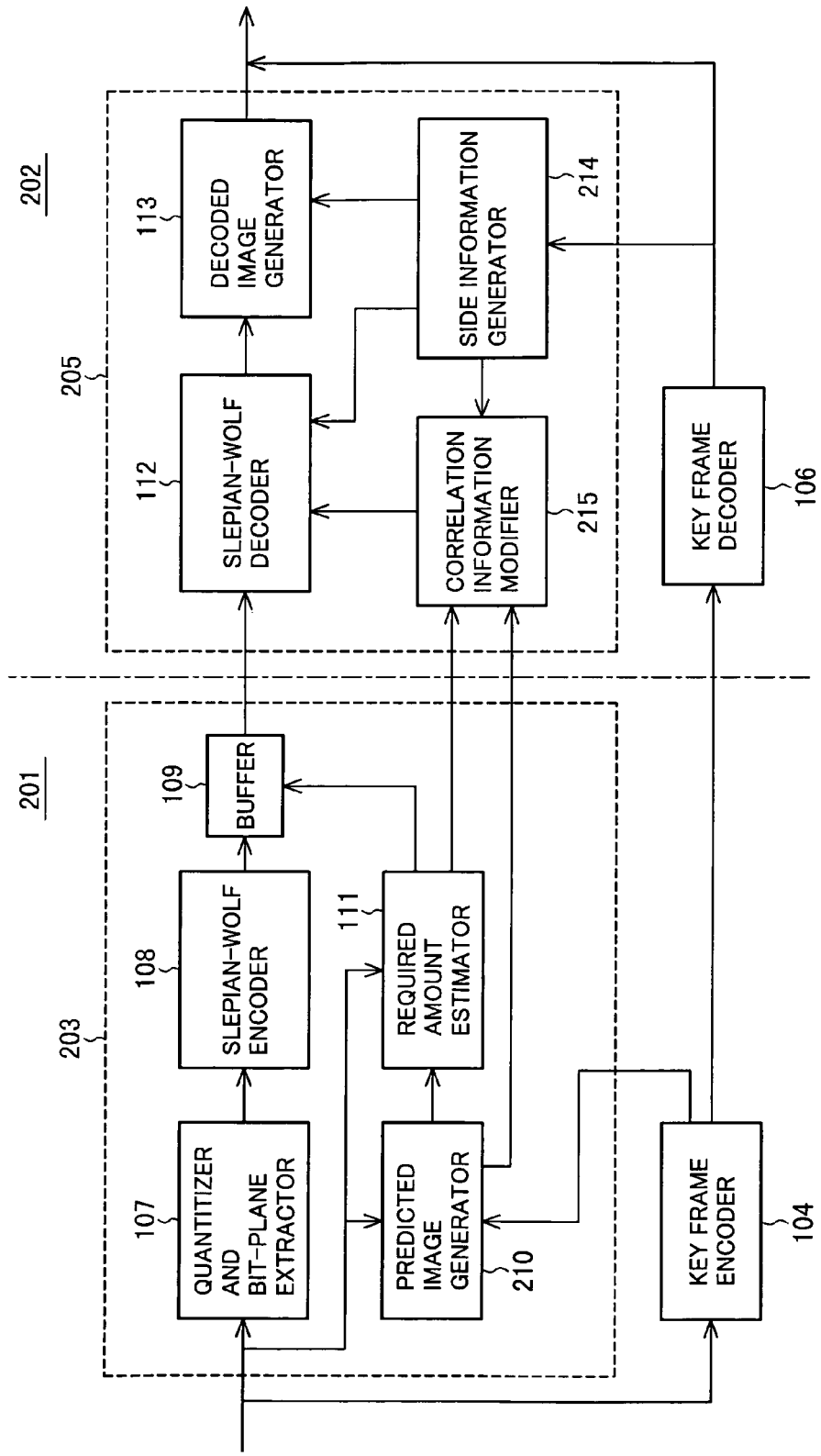
FIG. 4 is a block diagram of a moving picture coding system illustrating a second embodiment of the invention.

Referring to FIG. 4, the second embodiment is a moving picture coding system or distributed video coding system including a moving picture encoder 201 and a moving picture decoder 202 generally similar to the moving picture encoder and moving picture encoder in the first embodiment. The main difference is that the predicted image generator 210 in the moving picture encoder 201 provides encoder prediction method information to the correlation information modifier 215 in the moving picture decoder 202, indicating how predicted images are generated in the moving picture encoder 201. The correlation information modifier 215 modifies the correlation information received from the required amount estimator 111 on the basis of the encoder prediction method information and corresponding decoder prediction method information received from the side information generator 214, indicating how predicted images are generated in the moving picture decoder 202.

The key frame encoder 104 in the moving picture encoder 201 and the quantizer and bit-plane extractor 107, Slepian-Wolf encoder 108, buffer 109, and required amount estimator 111 in the Wyner-Ziv frame encoder 203 in the moving picture encoder 201 are identical to the corresponding elements in the first embodiment.

The key frame decoder 106 in the moving picture decoder 202 and the Slepian-Wolf decoder 112 and decoded image generator 113 in the Wyner-Ziv frame decoder 205 in the moving picture decoder 202 are identical to the corresponding elements in the first embodiment.

The encoding and decoding of Wyner-Ziv frames in the second embodiment will now be described with reference to the flowcharts in FIGS. 5 and 6, under the same assumptions as in the first embodiment.

Figure 5:
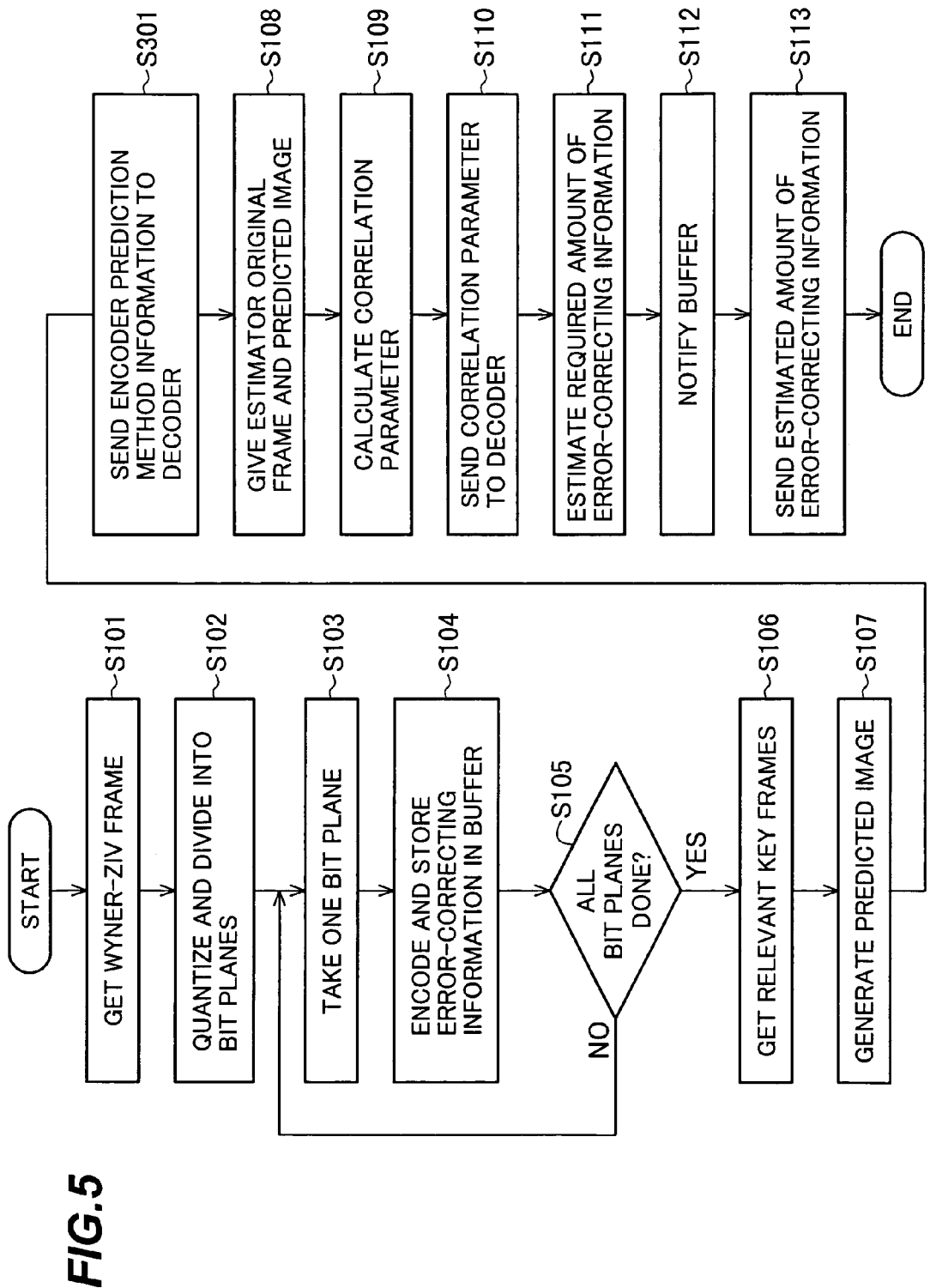
FIG. 5 is a flowchart illustrating the encoding process in the second embodiment.

Referring to FIG. 5, a Wyner-Ziv frame is encoded in the same way as in the first embodiment (steps S101 to S105) to obtain error-correcting information for each bit plane. The predicted image generator 210 receives the relevant key frame data and from the key frame encoder 104 (step S106) and generates a predicted image for the Wyner-Ziv frame (step S107), also as in the first embodiment.

Next, the predicted image generator 210 sends encoder prediction method information indicating how the predicted image was generated to the correlation information modifier 215 in the moving picture decoder 202 encoder (step S301). The encoder prediction method information is, for example, a numerical identifier such as '1' to indicate that the predicted image was generated from the preceding key frame or '2' to indicate that the predicted image was generated from the preceding and following key frames.

The remaining encoding steps are the same as in the first embodiment. The required amount estimator 111 receives the predicted image generated by the predicted image generator 210 and the original Wyner-Ziv frame (step S108), derives a parameter of the statistical distribution of prediction errors made by the predicted image generator 210 as correlation information (step S109), and sends this correlation parameter to the correlation information modifier 215 (step S110). The required amount estimator 111 also estimates how much error-correcting information the Wyner-Ziv frame decoder 205 will need (step S111) and notifies the buffer 109 (step S112), which sends the estimated amount of error-correcting information to the moving picture decoder 202 (step S113).

Figure 6:
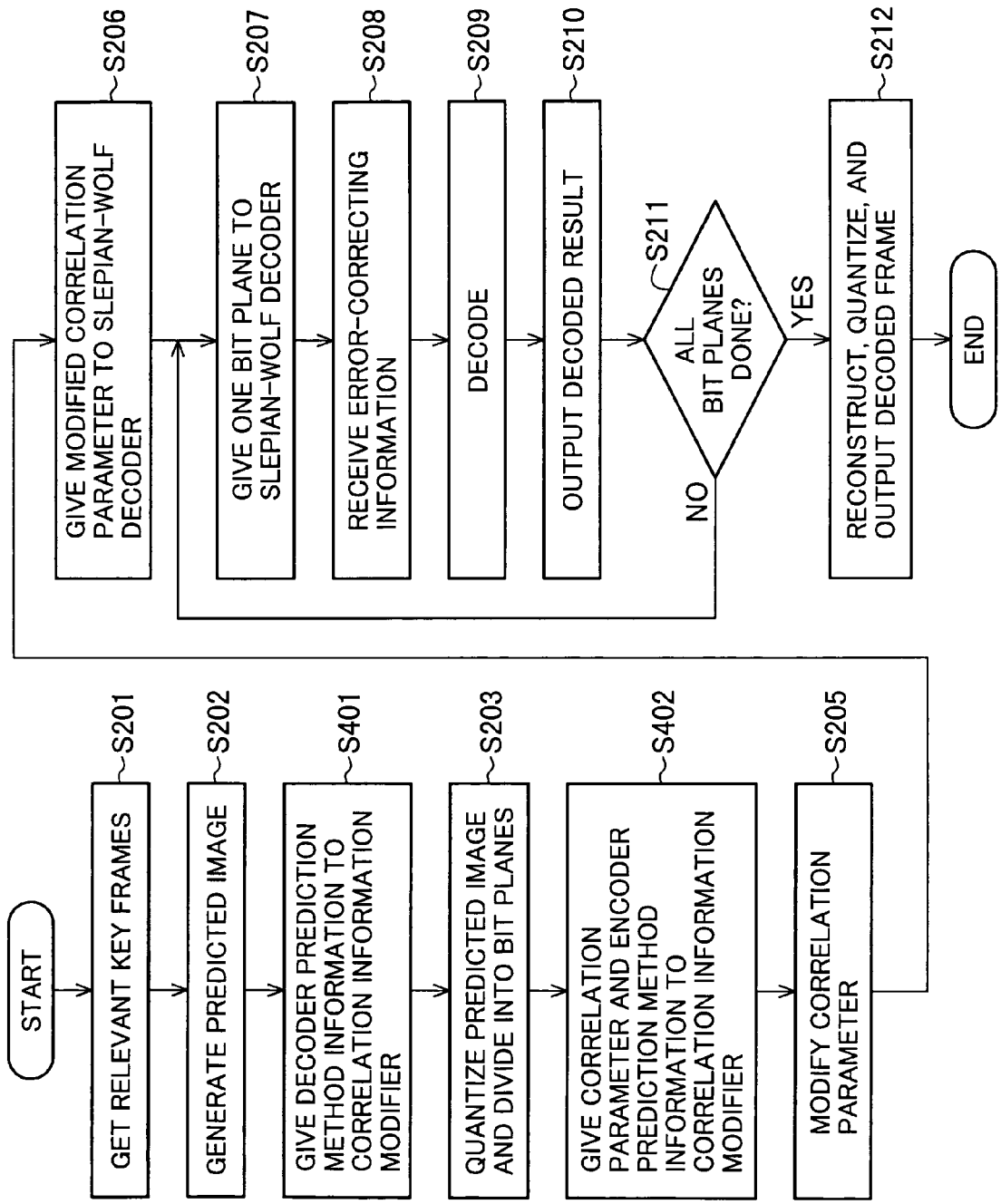
FIG. 6 is a flowchart illustrating the decoding process in the second embodiment.

Referring to FIG. 6, when the Wyner-Ziv frame is decoded, the side information generator 214 generates a predicted image in the same way as in the first embodiment (steps S201 and S202), and supplies the correlation information modifier 215 with decoder prediction method information indicating how the predicted image was generated (step S401). The decoder prediction method information may also be a numerical identifier, such as '1' to indicate that the predicted image was generated from the preceding key frame, '2' to indicate that the predicted image was generated from the preceding and following key frames, or '3' to indicate that the predicted image was generated from the preceding and following key frames with motion estimation and motion compensation.

The side information generator 214 also quantizes the predicted image and divides it into bit planes (step S203). The correlation information modifier 215 receives the correlation parameter and encoder prediction method information from the moving picture encoder 201 (step S402) and modifies the correlation parameter on the basis of both the encoder prediction method information and the decoder prediction method information (step S204).

As in the first embodiment, the correlation parameter may be a scale parameter α and the correlation information modifier 215 may modify it by multiplication by a weighting coefficient W. The correlation information modifier 215 may include, for example, a lookup table listing the possible combinations of encoder prediction method information and decoder prediction method information and giving a weighting coefficient W for each combination. If the predicted image generator 210 in the Wyner-Ziv frame encoder 203 and the side information generator 214 in the Wyner-Ziv frame decoder 205 use the same prediction method, for example, the weighting coefficient W may have a value of unity. If the predicted image generator 210 predicts the Wyner-Ziv frame on the basis of the preceding key frame and the side information generator 214 predicts the Wyner-Ziv frame on the basis of both the preceding and following key frames, thereby obtaining a better prediction, the weighting coefficient W may have a value higher than unity. If the side information generator 214 also performs motion estimation and compensation, thereby obtaining a still better prediction, the weighting coefficient W may have a still higher value. Appropriate values of the weighting coefficient W may be determined by experiment in advance, using different combinations of prediction methods on various moving picture sequences and calculating the resulting correlation parameters. When the side information generator 214 employs motion estimation and detection, the weighting coefficient W may vary depending on the amount of estimated motion.

The remaining steps are the same as in the first embodiment. The Slepian-Wolf decoder 112 receives the modified correlation parameter (step S206) and decodes each bit plane of the Wyner-Ziv frame (steps S207 to S211), and the decoded image generator 113 reconstructs, dequantizes, and outputs the decoded Wyner-Ziv frame (step S212).

The second embodiment enhances the effect of the first embodiment by using the prediction method information to modify the correlation information more accurately. This enables the Slepian-Wolf decoding process to converge even more quickly than in the first embodiment.

The invention is not limited to the embodiments described above. The following are a few possible variations.

The coded data, error-correcting information, correlation information, and encoder prediction method information need not be transmitted directly from the moving picture encoder to the moving picture decoder as shown in the drawings. Various types of indirect transmission are possible, including storage on a tangible medium that is later read by the moving picture decoder.

The key frames may be encoded by intraframe coding, by interframe coding, or by a dynamic mixture of both methods. For example, the key frame encoder may switch between intraframe and interframe coding adaptively, according to the content of the key frames. When interframe coding is employed, motion estimation and compensation may also be carried out.

A Wyner-Ziv frame may be predicted from the two preceding key frames, or the two preceding and two following key frames.

The encoder prediction method information and decoder prediction method information may be expressed in any form, and are not limited to the numerical identifiers shown as examples in the second embodiment.

The moving picture encoder may provide the correlation information modifier in the moving picture decoder with image characteristic information indicating a characteristic of each Wyner-Ziv frame, instead of or in addition to prediction method information indicating how the predicted image was obtained, and the correlation information modifier may modify the correlation information on the basis of the image characteristic information. One example of image characteristic information is motion information obtained by interframe coding of the key frames from which the Wyner-Ziv frame is predicted.

The method of predicting the Wyner-Ziv frames may be either fixed or dynamically variable in both the moving picture encoder and the moving picture decoder. When a fixed method is used, the fixed encoder prediction method information or decoder prediction method information need be provided to the correlation information modifier only once, during an initialization procedure, for example. Fixed decoder prediction method information may be permanently stored in the correlation information modifier. When the prediction method is varied dynamically, it may be varied according to motion information detected in interframe coding of the key frames. When no motion is detected from one key frame to the next, for example, the preceding key frame may be used as the predicted image of a Wyner-Ziv frame. When motion is detected, the predicted image may be generated by motion compensation.

In the second embodiment, the weighting coefficient by which the correlation parameter is multiplied may be derived from the encoder prediction method information alone, instead of from both the encoder prediction method information and the decoder prediction method information.

The input sequence of moving picture frames need not consist of alternate key frames and Wyner-Ziv frames. The sequence may be divided into key frames and Wyner-Ziv frames in any ratio. For example, two consecutive key frames may be followed by a single Wyner-Ziv frame, so that the ratio of key frames to Wyner-Ziv frames is 2:1. If interframe coding of key frames is employed in this case, the uneven temporal spacing between key frames must be taken into account.

Those skilled in the art will recognize that further variations are possible within the scope of the invention, which is defined in the appended claims.

What is claimed is:

1. A decoder for decoding a sequence of moving picture frames that has been divided into a sequence of key frames and a sequence of non-key frames, the decoder receiving coded data, error-correcting information, and correlation information from an encoder, the coded data representing the key frames, the error-correcting information representing the non-key frames, the correlation information indicating expected correlations between predicted and original forms of the non-key frames, the decoder comprising:
    a key frame decoder for decoding the coded data to obtain decoded key frames;
    a side image generator for generating, from the decoded key frames, a predicted image for each non-key frame in the sequence of non-key frames;

a correlation information modifier for modifying the correlation information received from the encoder to obtain modified correlation information;

an error-correcting decoder for correcting the predicted image generated by the side image generator according to the error-correcting information received from the encoder and the modified correlation information to obtain a decoded non-key frame; and a decoded image generator for generating a reconstructed non-key frame from the predicted image generated by the side image generator and the decoded non-key frame obtained by the error-correcting decoder;

wherein the decoder also receives from the encoder first prediction method information indicating a prediction method used by the encoder, and the correlation information modifier modifies the correlation information received from the encoder by multiplying the correlation information by a weighting coefficient determined from the first prediction method information.

2. The decoder of claim 1, wherein the correlation information modifier also holds second prediction method information indicating a prediction method used by the side image generator, and uses both the first prediction method information and the second prediction method information to determine the weighting coefficient.

3. The decoder of claim 1, wherein the decoder also receives from the encoder image characteristic information indicating a characteristic of the non-key frame, and the correlation information modifier modifies the correlation information received from the encoder by multiplying the correlation information by a weighting coefficient determined from the image characteristic information.

4. A moving picture coding system including the decoder of claim 1, and an encoder for encoding the sequence of moving picture frames that has been divided into a sequence of key frames and a sequence of non-key frames and sending the coded data, the error-correcting information and the correlation information to the decoder, the encoder comprising:

a key frame encoder for encoding the key frames to generate the coded data;

a non-key frame encoder for encoding the non-key frames to generate the error-correcting information;

a predicted image generator for generating, from the key frames, a predicted image for each non-key frame in the sequence of non-key frames; and an estimator for comparing each non-key frame with the predicted image generated by the predicted image generator for the non-key frame, thereby determining the correlation information, sending the correlation information to the decoder, and deciding how much error correcting information to send to the decoder.

5. A method of decoding a sequence of moving picture frames that has been divided into a sequence of key frames and a sequence of non-key frames, the method comprising:

receiving coded data, error-correcting information, and correlation information from an encoder, the coded data representing the key frames, the error-correcting information representing the non-key frames, the correlation information indicating expected correlations between predicted and original forms of the non-key frames, the method comprising:

decoding the coded data to obtain decoded key frames;

generating, from the decoded key frames, a predicted image for each non-key frame in the sequence of non-key frames;

modifying the correlation information received from the encoder to obtain modified correlation information;

correcting the predicted image according to the error-correcting information and the modified correlation information to obtain a decoded non-key frame; and generating a reconstructed non-key frame from the predicted image and the decoded non-key frame, further comprising receiving from the encoder first prediction method information indicating a prediction method used by the encoder, wherein modifying the correlation information further comprises multiplying the correlation information by a weighting coefficient determined from the first prediction method information.

6. The method of claim 5, further comprising obtaining second prediction method information indicating a prediction method used in generating, from the decoded key frames, a predicted image, wherein both the first prediction method information and the second prediction method information are used to determine the weighting coefficient.

7. The method of claim 5, further comprising receiving from the encoder image characteristic information indicating a characteristic of the non-key frame, wherein modifying the correlation information further comprises multiplying the correlation information by a weighting coefficient determined from the image characteristic information.

8. A machine-readable tangible medium storing instructions executable by a computing device to decode a sequence of moving picture frames by the method of claim 5.

* * * * *